(12) United States Patent
Sangveraphunski et al.

(10) Patent No.: US 6,542,951 B1
(45) Date of Patent: Apr. 1, 2003

(54) INFORMATION HANDLING SYSTEM HAVING INTEGRATED INTERNAL SCALABLE STORAGE SYSTEM

(75) Inventors: Vic Sangveraphunski, San Clemente, CA (US); Richard Pham, Anaheim, CA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/368,366

(22) Filed: Aug. 4, 1999

(51) Int. Cl.[7] .................. G06F 13/14; G06F 15/167
(52) U.S. Cl. .................. 710/305; 710/308; 709/213; 709/214; 709/215
(58) Field of Search ................. 710/305, 308; 709/213, 214, 215; 713/200

(56) References Cited

U.S. PATENT DOCUMENTS

| | | | |
|---|---|---|---|
| 5,237,661 A | * 8/1993 | Kawamura et al. | 710/52 |
| 5,428,760 A | * 6/1995 | Ghori et al. | 711/149 |
| 5,557,743 A | * 9/1996 | Pombo et al. | 713/200 |
| 6,279,040 B1 | * 8/2000 | Ma et al. | 709/231 |

* cited by examiner

Primary Examiner—Rupal Dharia
Assistant Examiner—Tim Vo
(74) Attorney, Agent, or Firm—Walter Malinowski; Mark S. Walker

(57) ABSTRACT

An information handling system having an integrated internal scalable switching storage system is disclosed. The information handling system includes a housing, a processor disposed in the housing and a memory device for storing a program of instructions executable by the processor. A bus of the information handling system is disposed in the housing, and the processor and the memory are coupled to the bus. A host bus adapter is coupled to the bus and is disposed in the housing. An information storage system is in turn coupled to the host bus adapter and is also disposed in the housing. The information storage system includes a backplane for coupling at least one information storage device to the host bus adapter. The information storage system and host bus adapter are preferably compliant with a scalable, switching, mass storage system standard such as Fiber Channel.

20 Claims, 4 Drawing Sheets

INFORMATION HANDLING SYSTEM HAVING INTEGRATED INTERNAL SCALABLE STORAGE SYSTEM

FIELD OF THE INVENTION

The present invention relates generally to the field of information handling systems, and more particularly to an information handling system having an internal scalable switching storage system.

BACKGROUND OF THE INVENTION

It is often desirable to expand the information storage capacity of an information handling system. For example, an information storage system may be externally coupled to an information handling system for providing a reliable mass storage system for storing large quantities of information such that the mass storage system is scalable to accommodate increasing the overall storage capacity of the mass storage system by adding a number of storage devices (e.g., disk drives or the like storage media) to the mass storage system as storage capacity requirements increase. Typically, the number of storage devices that may be included in the mass storage system exceeds the number of storage devices that an information handling system is capable of directly utilizing internally. For example, Fibre Channel (formerly known as Fiber Channel) is a standard promulgated by the Fibre Channel Association (FCA) for connecting storage systems to information handling systems. A redundant array of independent disks (RAID) is a mass storage system having a large number of storage disk drives typically compliant with a Fiber Channel standard. Under a Fibre Channel standard, a RAID storage system may utilize up to 127 disk drives for storing a large quantity of information. Typically, a mass storage system such as a RAID system provides high speed data transfer rates, high reliability, and scalability in a storage system external to an information handling system such as a server that controls and accesses the mass storage system. However, the features and performance of such a mass storage system have yet to be applied internally to an information handling system, even on a lesser scale. Utilization of mass storage system technology and topologies internal to an information handling system would allow the information handling system to easily accommodate an increasing number of storage devices with increasing storage capacity requirements. Furthermore, utilization of both internal and external mass storage system topologies in an information handling system would allow the information handling system to easily utilize external storage systems as the storage limits of the internal system are reached. Thus, there lies a need for an information handling system having an internal storage system that is scalable by utilization of mass storage system topologies and that is further scalable beyond the limit of the internal system by being configurable to accommodate both internal and external mass storage system topologies.

SUMMARY OF THE INVENTION

The present invention is directed to an information handling system having an integrated internal scalable switching storage system. In one embodiment, the invention includes a housing, a processor disposed in the housing and a memory device for storing a program of instructions executable by the processor, a bus disposed in the housing, the processor and the memory being coupled to the bus, a host bus adapter coupled to the bus and disposed in the housing, and an information storage system, coupled to the host bus adapter and disposed in the housing, the information storage system comprising a backplane for coupling at least one information storage device to the host bus adapter.

The present invention is further directed to a method for interfacing with an information storage system. In one embodiment, the method includes steps for transmitting a signal from a host information handling system to be received by the information storage system, determining whether the information storage system is internal to the host information handling system, in the event a determination is made that the information storage system is internal to the host information handling system, determining whether the information storage system is in a loop configuration, in the event a determination is made that the information storage system is in a loop configuration, sending the signal to an intended storage device of the information storage system by retransmitting the signal from a first storage device to a succeeding storage device until the information reaches the intended storage device, and, in the event a determination is made that the information storage system is not in a loop configuration, sending the signal to an intended storage device of the information storage system by transmitting the signal directly to the intended storage device.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
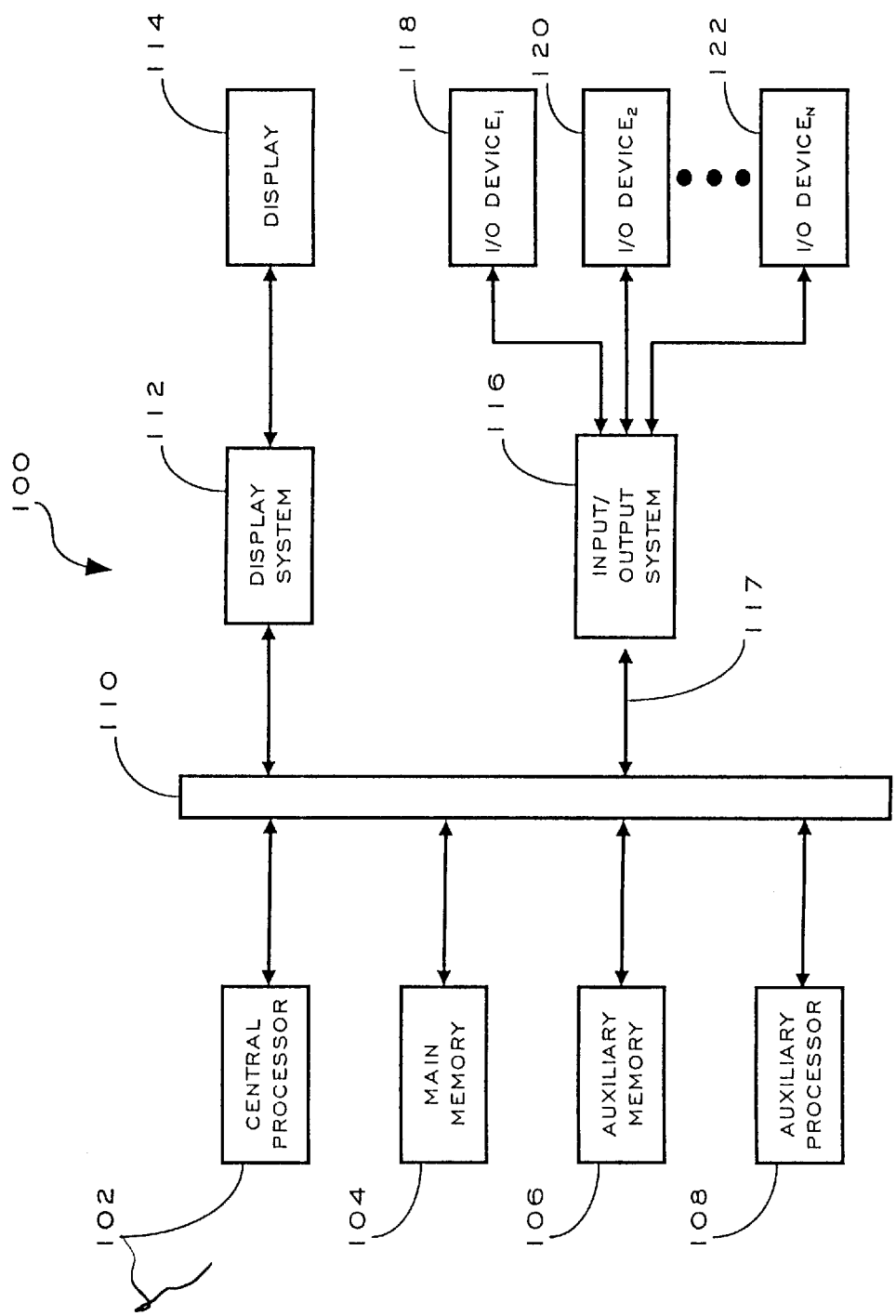
FIG. 1 is a block diagram of an information handling system operable to embody the present invention.

Referring now to FIG. 1, a hardware system in accordance with the present invention is shown. The hardware system shown in FIG. 1 is generally representative of the hardware architecture of an information handling system of the present invention. A central processor 102 controls the information handling system 100. Central processor 102 includes a central processing unit such as a microprocessor or microcontroller for executing programs, performing data manipulations and controlling the tasks of information handling system 100. Communication with central processor 102 is implemented through a system bus 110 for transferring information among the components of information handling system 100. Bus 110 may include a data channel for facilitating information transfer between storage and other peripheral components of information handling system 100. Bus 110 further provides the set of signals required for communication with central processor 102 including a data bus, address bus, and control bus. Bus 110 may comprise any state-of-the-art bus architecture according to promulgated standards: for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 100 may be compliant with any promulgated industry standard. For example, bus 100 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access. bus, IEEE P1394, Apple Desktop Bus (ADB), Concentration Highway Interface (CHI), Fire Wire, Geo Port, or Small Computer Systems Interface (SCSI), as examples.

Other components of information handling system 100 include main memory 104, auxiliary memory 106, and an auxiliary processor 108 as required. Main memory 104 provides storage of instructions and data for programs executing on central processor 102. Main memory 104 is typically semiconductor based memory such as dynamic random access memory (DRAM) and/or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Information handling system 100 may optionally include an auxiliary processor 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Information handling system 100 further includes a display system 112 for connecting to a display device 114, and an input/output (I/O) system 116 for connecting to one or more I/O devices 118, 120 up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between one or more of I/O devices 118–122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118–122 may provide or receive analog or digital signals for communication between information handling system 100 of the present invention and external devices, networks, or information sources. Input/output system 116 and I/O devices 118–122 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3 z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of information handling system 100 of FIG. 1 by one having ordinary skill in the art would not depart from the scope or the spirit of the present invention.

Figure 2:
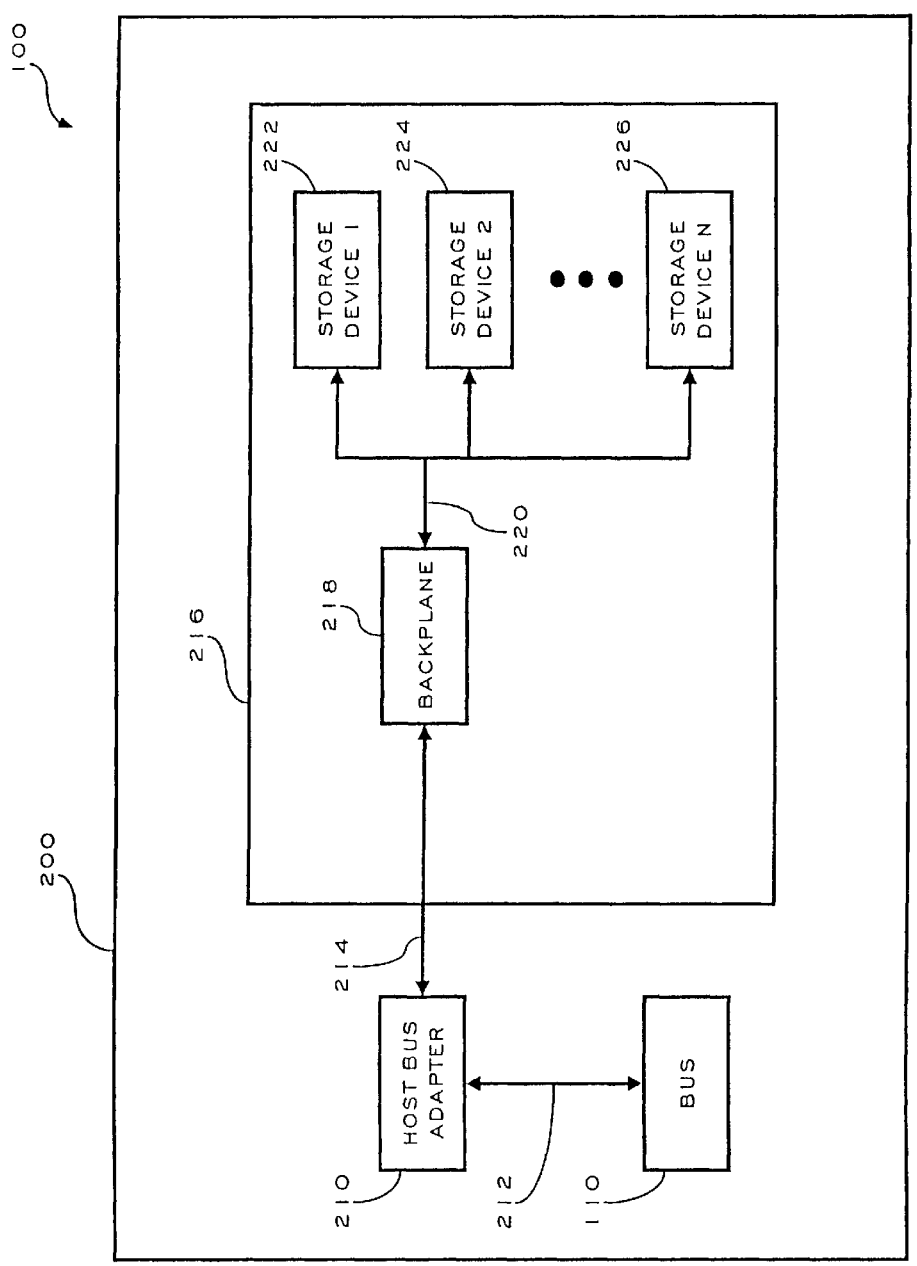
FIG. 2 is a block diagram of an information storage system of an information handling system in accordance with the present invention.

Referring now to FIG. 2, a block diagram of an information storage system of an information handling system in accordance with the present invention will be discussed. Information handling system 100 includes a housing 200 in which the hardware components of information handling system 100 are disposed. Hardware components of information handling system 100 disposed within housing 200 are generally referred to as internal components, while hardware components of information handling system 100 disposed outside of housing 200 are generally referred to as external components. A host bus adapter 210 is a controller that is disposed internal to housing 200 of information handling system 100. Host bus adapter 210 couples with bus 110 for connecting peripheral devices or hardware components to information handling system 100 via bus 110 . In one embodiment, host bus adapter is an AHA-F951 PCI-to-Fibre Channel Host Adapter available from Adaptec, Inc. of Milpitas, Calif. In an alternative embodiment, host bus adapter 210 is an intelligent RAID controller such as an i960® Intelligent I/O processor available from Intel Corp. of Santa Clara, Calif. A preferred intelligent RAID controller comprises a built-in FC-AL (Fibre Channel Arbitration Loop) distributed hub, which is simply an FC-AL port bypass circuit. This port bypass circuit may be used to provide synchronization to both external and internal FC disks in the loop, i.e., a bypass signal may be used to differentiate between the external and internal FC disks. For example, a standard DB-9 copper FC-0 interface, or an HSSDC (FC) connector, provides an external interface to an external host or JBOD (Just A Bunch of Drive) storage subsystem, and a twin-ax loop, or an HSSDC, interface connector provides an internal interface to an internal JBOD backplane. In a preferred embodiment of the present invention, the internal interface provides a bypass signal which is always defaulted to a "low true" or "enabled" setting, and the internal JBOD backplane is always ready during the system power on. A simple control circuit can receive the bypass signal and differentiate between an internal and an external JBOD system.

An information storage system 216 couples to host bus adapter 210 for storing information and data accessible and retrievable by information handling system 100. Information storage system 216 may include a backplane 218 coupled to host bus adapter 210 and at least one storage device 222 for coupling storage device 222 to host bus adapter 210. Backplane 218 is a framework for supporting interconnection of devices or hardware components of information handling system 100, and further provides power and data signals to the devices or hardware components. Although backplane 218 may couple to at least one storage device 222, backplane 218 may also couple a second storage device 224 in addition to storage device 222, and may ultimately couple up to N number of storage devices 226 with host bus adapter 210. In a preferred embodiment, information storage system 216 and host bus adapter 210 are compliant with a Fibre Channel standard. For example, information storage system 216 may implement Fibre Channel arbitration loop (FC-AL) compliant redundant array of independent disks (RAID). A RAID storage system is a system in which data and error-correction information is redundantly stored on multiple storage media to maintain reliability of the information stored in the storage system. Storage devices 222–226 may be coupled to backplane 218 in several configuration topologies such as in a loop configuration or in a point-to-point configuration. In a loop configuration, storage devices 222–226 are connected in a closed loop such that information received by a first storage device is retransmitted to the next storage device in the loop, and so on, until the information has traveled to the intended destination device. In a Fibre Channel loop, the loop may be redundant to ensure connectivity and may be arbitrated with a set of rules governing access to each storage device 222–226 by other storage devices or hardware components of information handling system 100. In a point-to-point configuration, each storage device 222–226 has a direct link to backplane 218.

Figure 3:
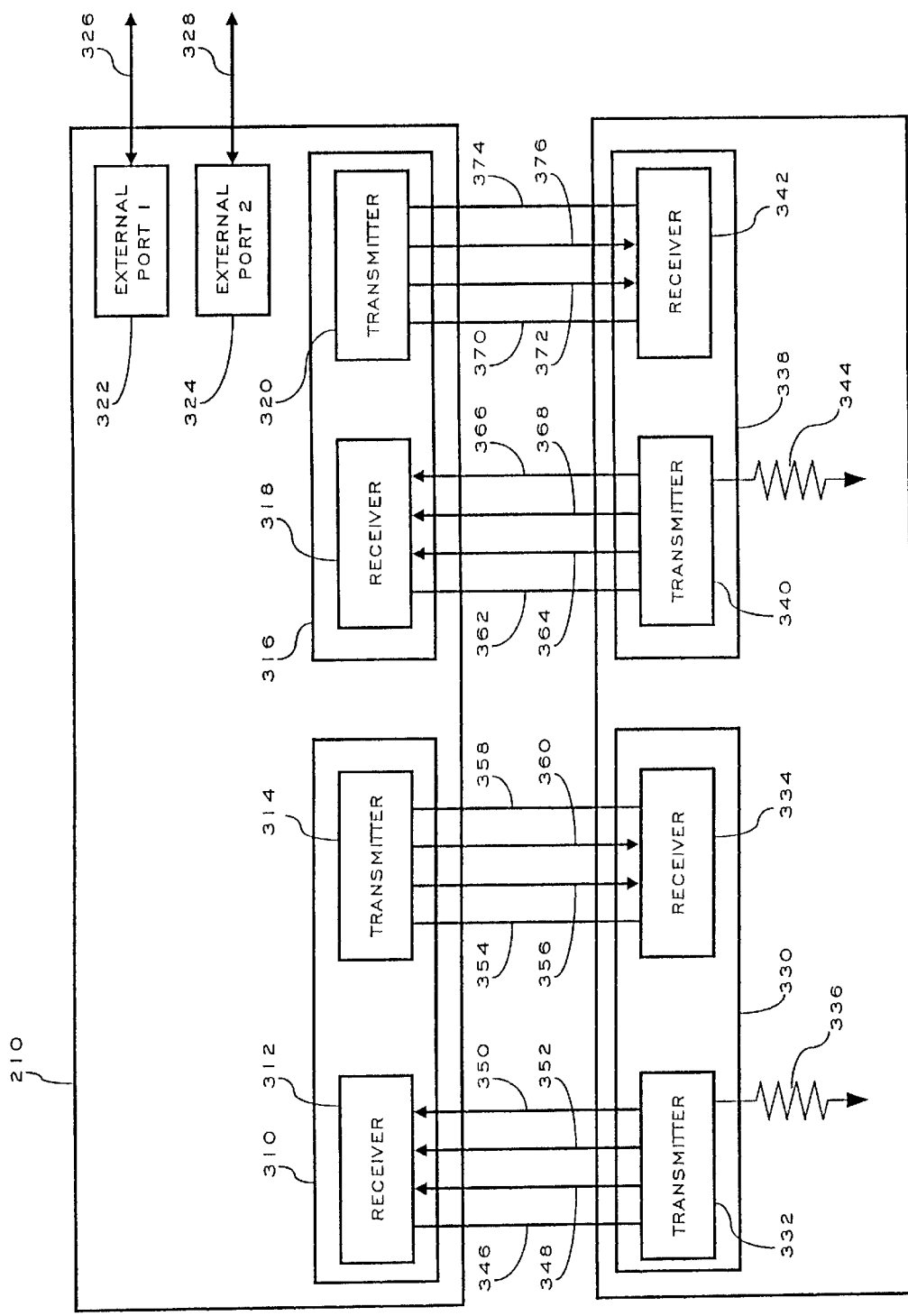
FIG. 3 is a block diagram of a configuration of a coupling between a host bus adapter and a storage system backplane in accordance with the present invention.

Referring now to FIG. 3, a block diagram of a configuration of a coupling between a host bus adapter and a storage system backplane in accordance with the present invention will be discussed. Host bus adapter 210 includes at least one external port 322 for coupling with an external storage system or network via an external connection 326. Host bus adapter 210 may also include one or more additional external ports 324 for coupling with additional external storage systems or networks via one or more additional external connections 328. Host bus adapter 210 includes at least one internal port 310, and as shown in FIG. 3, may include multiple internal ports in addition to the at least one internal port 310, for example internal port 316. Internal ports 310 and 316 each include receivers 312 and 318, respectively, and transmitters 314 and 320, respectively, for coupling with corresponding transmitters 332 and 340 and receivers 334 and 342, respectively of ports 330 and 338 of backplane 218.

Transmission lines 346, 354, 362 and 370 provide a reference voltage (e.g., ground) to receiver 312 and transmitter 332, transmitter 314 and receiver 334, receiver 318 and transmitter 340, and transmitter 320 and receiver 342, respectively. Transmission lines 348 and 364 couple TX– signal output of transmitters 332 and 340 to RX– signal inputs of receivers 312 and 318, respectively, while transmissions lines 352 and 368 couple TX+ signal outputs of transmitters 332 and 340 to RX+ signal inputs of receivers 312 and 318, respectively. Transmission lines 350 and 366 couple the bypass outputs of transmitters 332 and 340 to the bypass inputs of receivers 312 and 318, respectively. Pull down resistors 336 and 344 couple between the bypass inputs of transmitters 332 and 340, respectively and a reference voltage (e.g., ground) to provide bypass signals to transmitters 332 and 340, respectively. Transmission lines 356 and 372 couple TX+ signal outputs of transmitters 314 and 320 to RX+ signal inputs of receivers 334 and 342, respectively, while transmission lines 360 and 376 couple TX+ signal outputs of transmitters 314 and 320 to the RX+ signal inputs of receivers 334 and 342, respectively. Transmission lines 358 and 374 may be present in a four-conductor cable but are not required.

Figure 4:
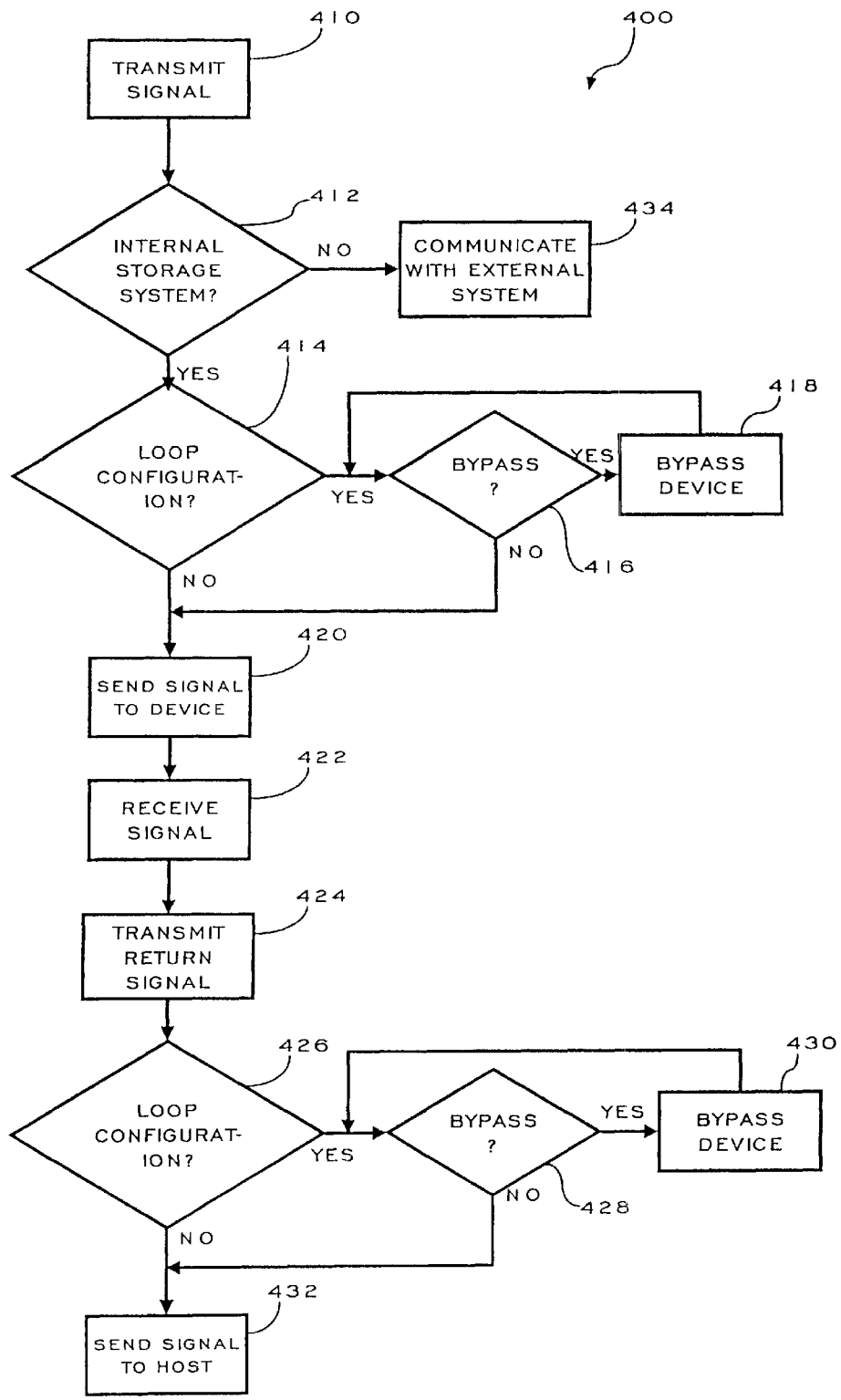
FIG. 4 is a flow diagram of a method for interfacing with an information storage system in accordance with the present invention.

Referring now to FIG. 4, a flow diagram of a method for interfacing with an information storage system in accordance with the present invention will be discussed. The method 400 initiates with the transmitting of a signal at step 410 from a host information handling system 100 to an information storage system coupled to information handling system 100. A determination is made at step 412 whether the information storage system is an internal storage system of information handling system 100. In the event the information storage system is not an internal system, then information handling system 100 communicates with an external system at step 434 via one of external ports 322 or 324 of host bus adapter 210. In the event the information storage system is an internal system, such as information storage system 216, communication may occur with the internal system by continuing execution of method 400. A determination is made at step 414 whether information storage system 216 is in a loop configuration. In the event information storage system 216 is in a loop configuration, a determination is made at step 416 whether the succeeding device (e.g., one of storage devices 222–226) is in a bypass mode. In the event the succeeding device is in bypass mode, the device is bypassed at step 418, and the method continues at step 416 until the succeeding device is not in bypass mode at which event method 400 may continue at step 420. In the event information storage system 216 is not determined to be in a loop configuration (e.g., information storage system 216 is in a point-to-point configuration), or in the event a succeeding device (one of storage devices 222–226) is not in bypass mode, the signal is sent to the intended device (one of storage devices 222–226) at step 420. In a non-loop configuration, the signal may be transmitted directly to the intended device, or in a loop configuration, the signal may be retransmitted from one device to a succeeding device, and, if necessary, bypassing any intermediate devices that are in bypass mode as determined by steps 416 and 418. The intended device receives the signal at step 422. A return signal may be transmitted from the intended device at step 424 to be received by information handling system 100. A determination is made at step 426 may be made at step 426 whether information storage system 216 is in a loop configuration. Step 426 may be subsumed into step 414 such that.steps 414 and 426 are not required to be repeated if the determination of step 414 is known. 1f the determination of step 414 is unknown, undetermined, altered, etc., step 426 may be executed as a separate step from step 414. In the event that a determination is made that information storage system 216 is not in a loop configuration, the return signal may be transmitted directly from storage device 222 to information handling system 100. In the event information storage system 216 is determined to be in a loop configuration, a determination is made at step 428 whether a succeeding device is in bypass mode. In the event the succeeding device is in bypass mode, the succeeding device is bypassed at step 430 and method 400 continues execution at step 428. In the event a succeeding device is not bypassed, method 400 continues by retransmitting the signal to succeeding devices in the loop until the signal is transmitted to host information handling system 100 at step 432, bypassing, if necessary, any intermediate device in a bypass mode as determined by steps 428 and 430.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the information handling system having integrated an internal scalable storage system of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An information handling system, comprising:
  a housing;
  a processor disposed in said housing and a memory device for storing a program of instructions executable by said processor;
  a bus disposed in said housing, said processor and said memory being coupled to said bus;
  a host bus adapter coupled to said bus and disposed in said housing; and
  an information storage system, coupled to said host bus adapter and disposed in said housing, said information storage system comprising a backplane for coupling at least one information storage device to said host bus adapter,
  said backplane having a pull down resistor coupled between a bypass input of said host bus adapter and a reference voltage for applying a bypass signal to said bypass input.

2. An information handling system as claimed in claim 1, said host bus adapter having a first port for coupling with said information storage system disposed in said housing and a second port for coupling with an information storage system disposed outside of said housing.

3. An information handling system as claimed in claim 1, said host bus adapter and said information storage system being in compliance with a Fibre Channel standard.

4. An information handling system as claimed in claim 1, said at least one information storage device comprising at least two information storage devices in a loop configuration.

5. An information handling system as claimed in claim 1, said at least one information storage device comprising at least two information storage devices in a point-to-point configuration.

6. An information handling system, comprising:
  means for housing the information handling system;
  means, disposed in said housing means, for executing a program of instructions, and means for storing the program of instructions executable by said executing means;
  means, disposed in said housing means, for transferring information in the information handling system, said executing means and said program storing means being coupled to said information transferring means;
  means, coupled to said information transferring means and disposed in said housing means, for coupling a peripheral device to the information handling system; and
  means for storing information, coupled to said coupling means and disposed in said housing means, said information storing means comprising means for interconnecting at least one information storage medium to said coupling means, said interconnecting means including means coupled between a bypass input of said information transferring means and a reference voltage for applying a bypass signal to said bypass input.

7. An information handling system as claimed in claim 6, said at least information transferring means having a first means for channeling information between said information transferring means and said information storing means disposed in said housing means, and a second means for channeling information between said information transferring means and means for storing information disposed outside of said housing means.

8. An information handling system as claimed in claim 6, said information transferring means and said information storing means being in compliance with a Fibre Channel standard.

9. An information handling system as claimed in claim 6, said at least one information storage medium comprising at least two information storage media in a loop configuration.

10. An information handling system as claimed in claim 6, said at least one information storage medium comprising at least two information storage media in a point-to-point configuration.

11. A method for interfacing with an information storage system, comprising:
  transmitting a signal from a host information handling system to be received by the information storage system;

determining whether the information storage system is internal to the host information handling system;

in the event a determination is made that the information storage system is internal to the host information handling system, determining whether the information storage system is in a loop configuration;

in the event a determination is made that the information storage system is in a loop configuration, sending the signal to an intended storage device of the information storage system by retransmitting the signal from a first storage device to a succeeding storage device until the information reaches the intended storage device; and in the event a determination is made that the information storage system is not in a loop configuration, sending the signal to an intended storage device of the information storage system by transmitting the signal directly to the intended storage device.

12. A method as claimed in claim 11, further comprising the step of, in the event a determination is made that the information storage system is not internal to the host information handling system, sending the signal to an intended storage device by communicating with the external information storage system.

13. A method as claimed in claim 11, further comprising the steps of, in the event a determination is made that the information storage system is in a loop configuration, determining whether a storage device is in a bypass mode, in the event it is determined that the storage device is in a bypass mode, bypassing the storage device in the bypass mode, and otherwise sending the signal to the intended storage device.

14. A method as claimed in claim 11, further comprising the steps of, transmitting a signal from a storage device of the information storage system to be received by the host information handling system, and if necessary, determining whether the information storage system is in a loop configuration, in the event a determination is made that the information storage system is in a loop configuration, sending the signal to the host information handling system by retransmitting the signal from a first storage device to a succeeding storage device until the information reaches the host information handling system, and, in the event a determination is made that the information storage system is not in a loop configuration, sending the signal to the host information handling system by transmitting the signal directly to the host information handling system.

15. A method as claimed in claim 14, further comprising the steps of, in the event a determination is made that the information storage system is in a loop configuration, determining whether a storage device is in a bypass mode, in the event it is determined that the storage device is in a bypass mode, bypassing the storage device in the bypass mode, and otherwise sending the signal to the host information handling system.

16. A program of instructions storable on a medium readable by an information handling system for causing the information handling system to execute steps for interfacing with an information storage system, the steps comprising:

transmitting a signal from a host information handling system to be received by the information storage system;

determining whether the information storage system is internal to the host information handling system;

in the event a determination is made that the information storage system is internal to the host information handling system, determining whether the information storage system is in a loop configuration;

in the event a determination is made that the information storage system is in a loop configuration, sending the signal to an intended storage device of the information storage system by retransmitting the signal from a first storage device to a succeeding storage device until the information reaches the intended storage device; and in the event a determination is made that the information storage system is not in a loop configuration, sending the signal to an intended storage device of the information storage system by transmitting the signal directly to the intended storage device.

17. A program of instructions as claimed in claim 16 the steps further comprising the step of, in the event a determination is made that the information storage system is not internal to the host information handling system, sending the signal to an intended storage device by communicating with the external information storage system.

18. A program of instructions as claimed in claim 16, the steps further comprising the steps of, in the event a determination is made that the information storage system is in a loop configuration, determining whether a storage device is in a bypass mode, in the event it is determined that the storage device is in a bypass mode, bypassing the storage device in the bypass mode, and otherwise sending the signal to the intended storage device.

19. A program of instructions as claimed in claim 16, the steps further comprising the steps of, transmitting a signal from a storage device of the information storage system to be received by the host information handling system, and if necessary, determining whether the information storage system is in a loop configuration, in the event a determination is made that the information storage system is in a loop configuration, sending the signal to the host information handling system by retransmitting the signal from a first storage device to a succeeding storage device until the information reaches the host information handling system, and, in the event a determination is made that the information storage system is not in a loop configuration, sending the signal to the host information handling system by transmitting the signal directly to the host information handling system.

20. A program of instructions as claimed in claim 19, the steps further comprising the steps of, in the event a determination is made that the information storage system is in a loop configuration, determining whether a storage device is in a bypass mode, in the event it is determined that the storage device is in a bypass mode, bypassing the storage device in the bypass mode, and otherwise sending the signal to the host information handling system.

* * * * *